United States Patent
Iyer

(10) Patent No.: US 10,417,374 B1
(45) Date of Patent: *Sep. 17, 2019

(54) METHOD AND APPARATUS FOR PERFORMING REGISTER RETIMING BY UTILIZING NATIVE TIMING-DRIVEN CONSTRAINTS

(71) Applicant: Altera Corporation, San Jose, CA (US)

(72) Inventor: Mahesh A. Iyer, Fremont, CA (US)

(73) Assignee: Altera Corporation, San Jose, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 15/150,124

(22) Filed: May 9, 2016

(51) Int. Cl.
*G06F 17/50* (2006.01)

(52) U.S. Cl.
CPC ........ *G06F 17/5081* (2013.01); *G06F 17/505* (2013.01); *G06F 17/5072* (2013.01); *G06F 17/5077* (2013.01); *G06F 2217/64* (2013.01); *G06F 2217/84* (2013.01)

(58) Field of Classification Search
CPC ............. G06G 17/505; G06G 17/5031; G06G 17/5045; G06G 17/5054; G06G 17/5068; G06G 17/5081
USPC ................................ 716/104, 108, 113, 134
See application file for complete search history.

(56) References Cited

U.S. PATENT DOCUMENTS

| | | | | |
|---|---|---|---|---|
| 7,120,883 B1 * | 10/2006 | van Antwerpen | .. | G06F 17/5045 716/102 |
| 8,381,142 B1 * | 2/2013 | Hutton | ................ | G06F 17/5054 716/100 |
| 2004/0068331 A1 * | 4/2004 | Cronquist | ........... | G06F 17/5045 700/18 |
| 2005/0132316 A1 * | 6/2005 | Suaris | ................ | G06F 17/5031 716/108 |
| 2015/0033198 A1 * | 1/2015 | Fung | .................. | G06F 17/5054 716/113 |
| 2015/0040094 A1 * | 2/2015 | Caldwell | ............. | G06F 17/5081 716/134 |
| 2016/0350468 A1 * | 12/2016 | Chiu | .................... | G06F 17/5081 |
| 2016/0357899 A1 * | 12/2016 | Gamsa | .................. | G06F 17/505 |
| 2017/0068765 A1 * | 3/2017 | Sinnadurai | .......... | G06F 17/5081 |
| 2018/0018417 A1 * | 1/2018 | Iyer | ..................... | G06F 17/5031 |

OTHER PUBLICATIONS

Mneimneh, et al.; "Reverse: Efficient Sequential Verification for Retiming"; Twelfth International Workshop on Logic and Synthesis, Laguna Beach, California, May 28-30, 2003.
Leiserson, et al.; "Retiming Synchronous Circuitry"; Algorithmica (1991) 6: 5-35.

* cited by examiner

*Primary Examiner* — Paul Dinh

(57) ABSTRACT

A method for designing a system on a target device includes synthesizing the system. The system is placed on the target device. The system is routed on the target device. Register retiming is performed on the system by applying timing analysis constraints, retiming constraints, bound constraints, and ordering constraints when solving for retiming labels that represent a number and direction of register movement along a path between nodes in the system, and arrival times on all nodes in the system to reflect the maximum delay in the system, to improve timing and meet target delay constraints.

19 Claims, 10 Drawing Sheets

METHOD AND APPARATUS FOR PERFORMING REGISTER RETIMING BY UTILIZING NATIVE TIMING-DRIVEN CONSTRAINTS

FIELD

Embodiments of the present invention relate to tools for designing systems on target devices. More specifically, embodiments of the present invention relate to a method and apparatus for performing register retiming by utilizing native timing-driven constraints.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, placement, routing, and timing analysis of the system on the target device.

Register retiming is a circuit optimization technique that is used to improve the performance of sequential circuits. Register retiming repositions registers (flip-flops) in the circuit without changing the combinational logic of the circuit. A theoretical formulation for performing global retiming was first introduced by Leiserson and Saxe. While their approach utilized algorithms that supported polynomial time complexity, it also required explicit computation of pair-wise delays between nodes on every path of the circuit as well as the identification of the minimum number of registers between those pairs of nodes. Subsequent attempts to perform global retiming included an approach by Shenoy and Rudell which eliminated redundant timing constraints in the retiming graph.

SUMMARY

According to an embodiment of the present disclosure, native modeling of timing analysis constraints is utilized for register retiming. A general-purpose constraint solver is used to process complex constraints such as a max function which allows for native timing analysis. This formulation and approach for solving a global register retiming problem may be used to address min-period retiming, min-area retiming, and constrained min-area retiming. This formulation and approach for solving the global register retiming problem achieves better quality of results and improved runtime than prior approaches by avoiding explicit calls to static timing analysis and explicit computation of pair-wise delays for nodes on all paths of the circuit. This formulation and approach for solving the global register retiming problem may also be extended to handle hold time analysis and optimization, and may leverage advances in constraint solver technology.

According to an embodiment of the present disclosure, a method for designing a system on a target device includes synthesizing the system. The system is placed on the target device. The system is routed on the target device. Register retiming is performed on the system by applying timing analysis constraints when solving for retiming labels that represent a number and direction of register movement along a path between nodes in the system to improve timing. According to an aspect of the present disclosure, a timing analysis constraint is defined for each of the nodes, wherein the timing analysis constraint reflects a relationship between output arrival times of the outputs of the node, the input arrival times of the inputs of the node, and timing arc delays for the node and a new weight on an input connection to the node representing a number of registers on the input connection during and after register retiming.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
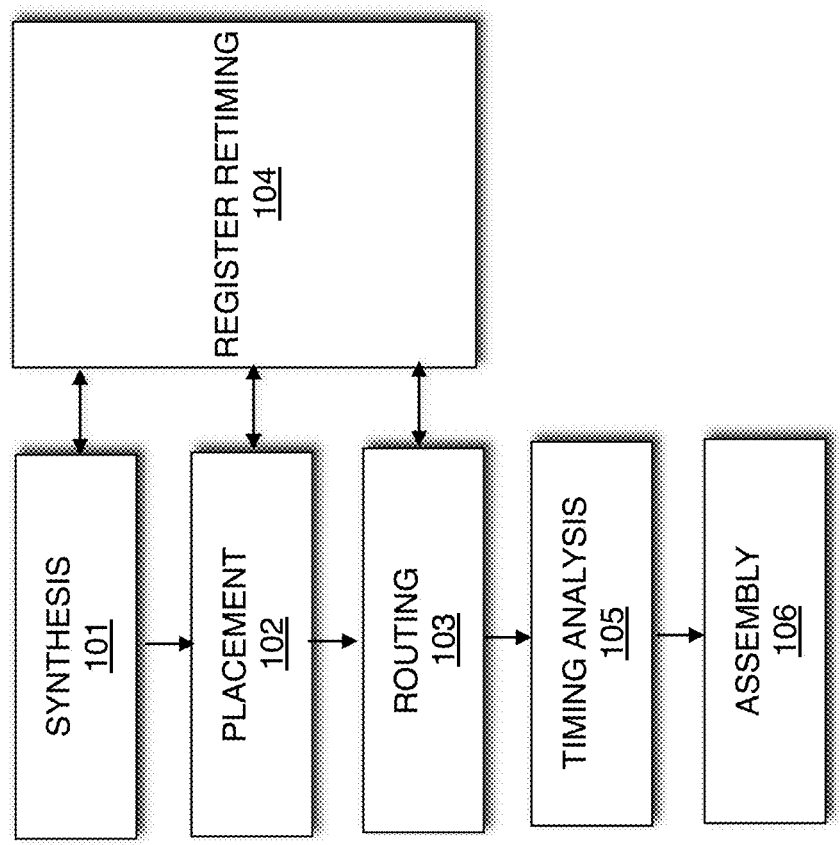
FIG. 1 is a flow chart illustrating a method for designing a system on a target device according to an exemplary embodiment of the present disclosure.

FIG. 1 is a flow chart illustrating a method for designing a system on a target device according to an exemplary embodiment of the present disclosure. The target device may be a field programmable gate array (FPGA), application specific integrated circuit (ASIC), a structured ASIC, or other device. According to one embodiment, the procedure illustrated in FIG. 1 may be performed by a computer aided design (CAD)/electronic design automation (EDA) tool implemented on a computer system.

At 101, a design for the system is synthesized. The specification for the system may be provided though a design entry tool. The specification may describe components and interconnections in the system. According to an embodiment of the present invention, the design entered may be in register transfer level (RTL) in a hardware description language (HDL). Synthesis includes generating a logic design of the system to be implemented by the target device. According to an embodiment of the present invention, synthesis generates an optimized logical representation of the system from an HDL design definition. The optimized logical representation of the system may include a representation that has a minimized number of functional blocks such as logic gates, logic elements, and registers required for the system. Synthesis also includes mapping the optimized logical representation. Mapping includes determining how to implement logic gates and logic elements in the optimized logic representation with the types or categories of resources available on the target device. The resources available on the target device may be referred to as "cells" or "components" and may include logic-array blocks, registers, memories, digital signal processing blocks, input output elements, and other components. According to an embodiment of the present invention, a netlist is generated from mapping. This netlist may be an optimized technology-mapped netlist generated from the HDL.

At 102, the system is placed. According to an embodiment of the present invention, placement involves placing the technology-mapped logical system design on the target device. Placement includes fitting the system on the target device by determining which specific resources on the target device are to be assigned to and implemented by the technology-mapped netlist determined during synthesis. Placement may include clustering which involves grouping logic elements together to form the logic clusters present on the target device.

At 103, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 104, register retiming is performed on the system. According to an embodiment of the present invention, register retiming improves the performance of sequential circuit by repositioning registers (flip-flops) without changing the combinational elements between registers and/or input outputs (IOs) that have the worst delay. Reducing the delay on combinational paths is a goal of register retiming. It should be appreciated that register retiming 104 may be performed during and/or after synthesis 101, placement 102, and/or routing 103.

At 105, timing analysis is performed on the retimed design of the system generated. According to an embodiment of the present invention, the timing analysis determines whether timing constraints of the system are satisfied and generates signoff-quality timing reports for the user.

At 106, assembly is performed. The assembly procedure involves creating a data file that includes information determined by the procedures described at 101-105. The data file may be a bit stream that may be used to program a target device. By programming the target with the data file, components on the target device are physically transformed to implement the system.

Figure 2A:
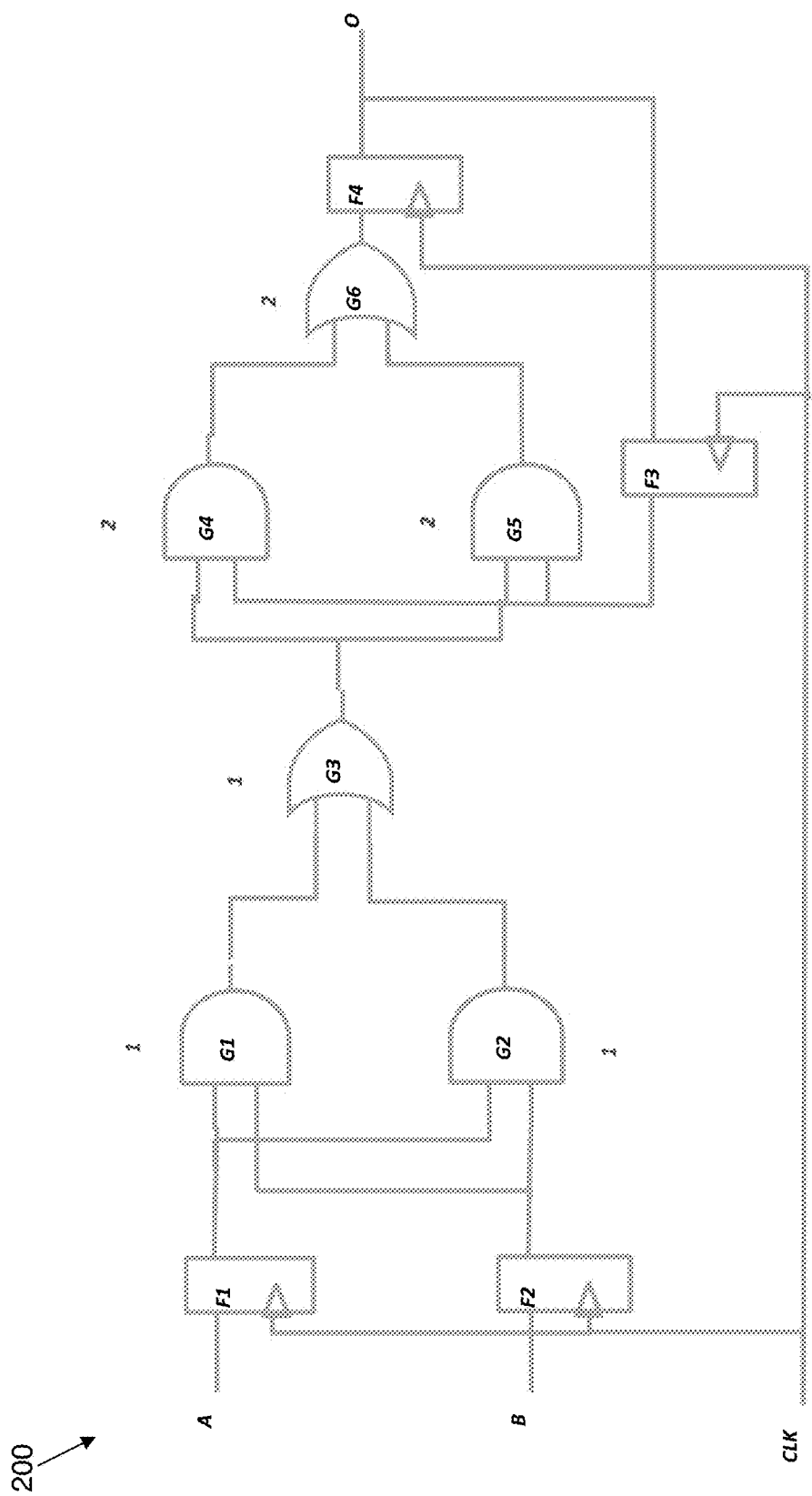
FIGS. 2A-2C illustrate an example of register retiming according to an exemplary embodiment of the present disclosure.
Figure 2B:
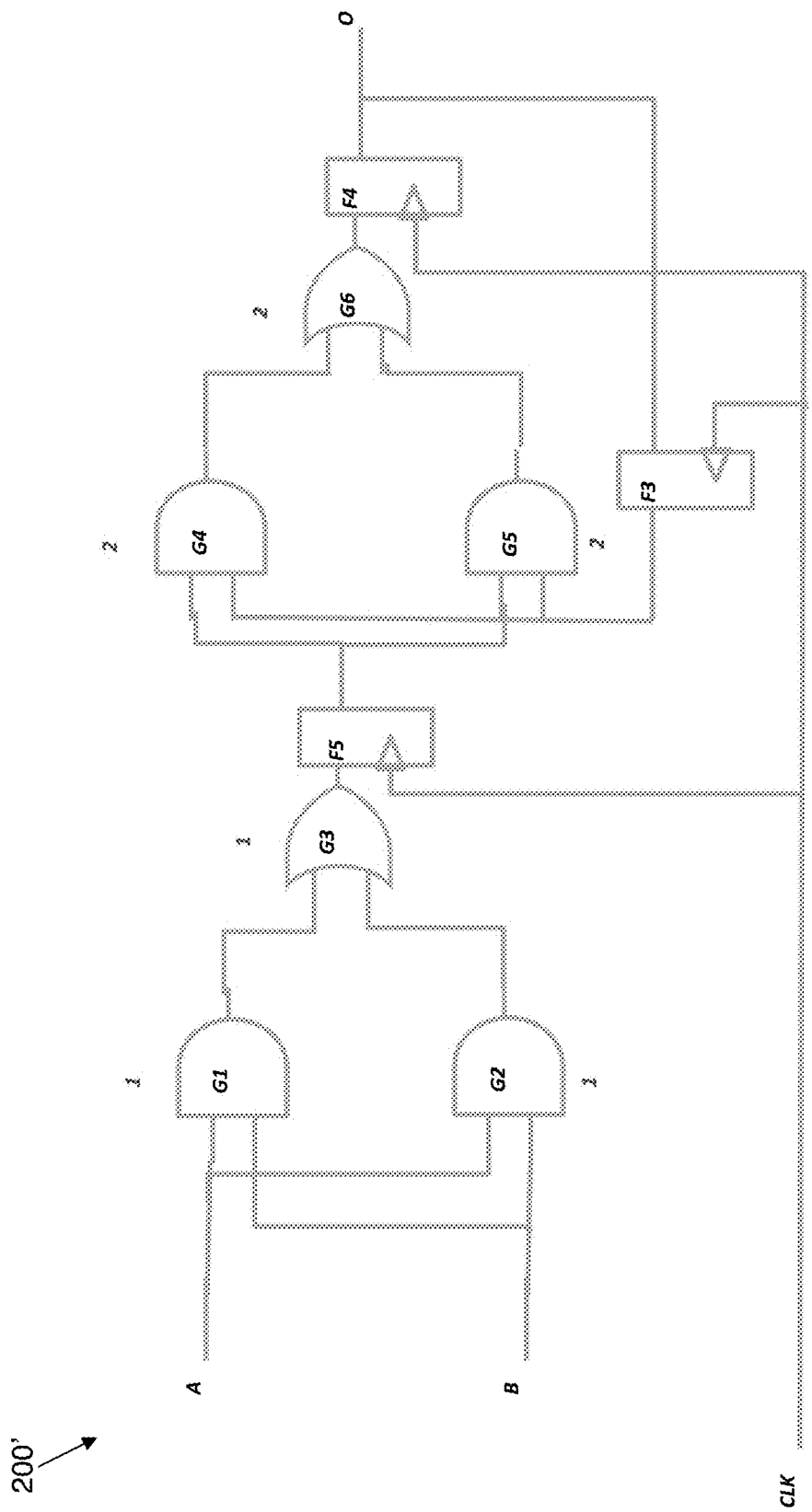
Figure 2C:
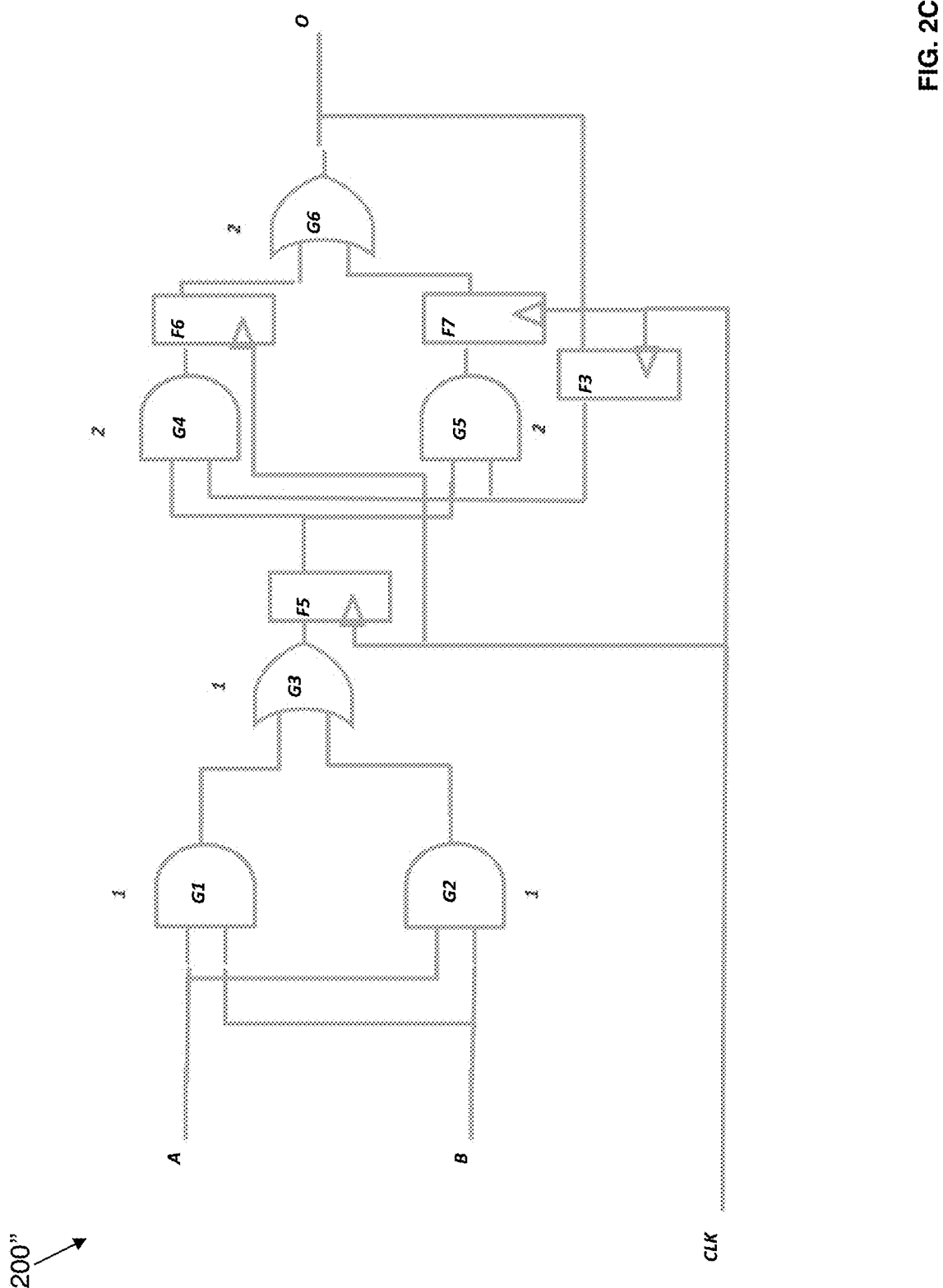

Referring back to 104, it should be appreciated that various approaches to register retiming may be taken. Min-period retiming may be performed where flip-flops are repositioned in a circuit to achieve the best delay to minimize a clock period of the circuit. Min-period retiming does not impose a restriction on a number of flip-flops in the circuit after register retiming. Min-area retiming may be performed where flip-flops are repositioned in the circuit to minimize a number of flip-flops in the circuit. Min-area retiming does not impose a restriction on a clock period of the circuit after register retiming. Constrained min-area retiming may be performed where flip-flops are repositioned in the circuit to minimize a number of flip-flops in the circuit subject to a user-specified clock period constraint. A practical variant of constrained min-area retiming is the approach of minimizing a number of flip-flops in a circuit while achieving a best clock period that is closest to a user-specified clock period constraint. It should be appreciated that a combination of these approaches may be taken when performing register retiming at 104. FIGS. 2A-2C illustrate an example of register retiming according to an embodiment of the present disclosure.

FIG. 2A illustrates an exemplary sequential circuit 200 according to an embodiment of the present disclosure. This sequential circuit 200 has six combinational gates, G1, G2, G3, G4, G5, and G6 with delays of 1, 1, 1, 2, 2, 2 respectively, as shown. The sequential circuit 200 also has four flip-flops, F1, F2, F3, F4 that are all positive edge-triggered flip-flops clocked by the same clock CLK. The sequential circuit 200 has 3 primary inputs A, B, and CLK, one primary output, O, and fanouts reconverging on gates G3 and G6. The maximum combinational delay through this circuit is 6. One such path is F1→G1→G3→G4→G6→F4. The clock period for this circuit is dictated by this longest path delay of 6.

FIG. 2B illustrates a retimed sequential circuit 200'. The retimed sequential circuit 200' has flip-flops F1 and F2 forward retimed through gates G1, G2, and G3. Retimed sequential circuit 200' has only 3 flip-flops and the maximum combinational delay is 4. This circuit has three flip-flops and it is the minimum number of flip-flops that is achievable for this circuit.

FIG. 2C illustrates a further retimed sequential circuit 200". The sequential circuit 200' from FIG. 2B has its clock period reduced by backward retiming flip-flop F4 across gate G6. This backward-retimed circuit is shown in FIG. 2C. Sequential circuit 200" has a maximum combinational delay of 2 for all input-to-flip-flop, flip-flop-to-flip-flop, and flip-flop-to-output paths. Since the worst delay of a single combinational cell in this circuit is 2, this is the minimum delay that can be achieved. Hence the sequential circuit 200" in FIG. 2C represents the min-period retiming solution.

A synchronous sequential circuit, such as the circuit shown in FIGS. 2A-C, may include a plurality of combinational logic gates and flip-flops. When performing register retiming on a synchronous sequential circuit, the following assumptions may be made. All flip-flops in the circuit are clocked by the same clock source with the same edge relationship. Clock skew to all the registers are zero. Delays of all combinational gates are fixed and do not depend on actual loading seen by the gates. There are no asynchronous loops. Complex registers including load, synchronous clear, and clock enable may be modeled with simple D flip-flops and associated combinational logic. According to an embodiment of the present disclosure, all flip-flops have a known power-up state that is configurable to either 0 or 1. According to an embodiment of the present disclosure, all logic gates in the circuit can produce a 0 and 1 for some input combination of values, and no logic gate is a constant function.

According to an embodiment of the present disclosure, when performing register retiming on the synchronous sequential circuit, the circuit is modeled as a retiming graph G(V, E), where the vertices represent the combinational logic gates and the edges represent the connection to other combinational logic gates, inputs or outputs of the circuit traversing through one or more flip-flops. Each edge has a corresponding weight that represents the number of flip-flops on that edge connection.

Figure 3:
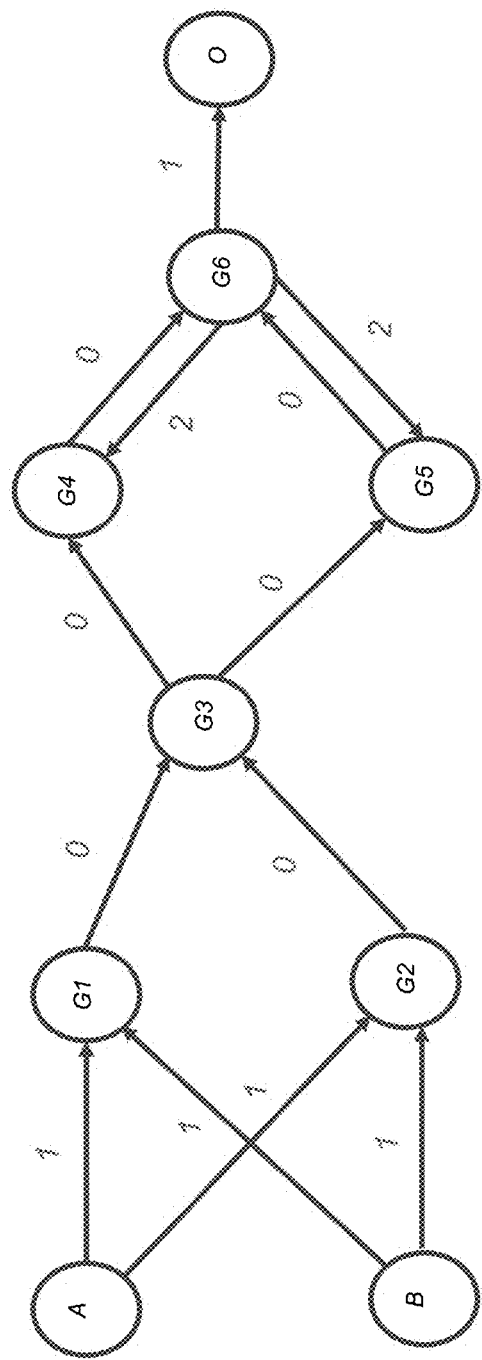
FIG. 3 illustrates a retiming graph according to an exemplary embodiment of the present disclosure.

FIG. 3 illustrates a retiming graph 300 according to an exemplary embodiment of the present disclosure. Retiming graph 300 represents the synchronous sequential circuit 200 shown in FIG. 2A. As shown, every fanout edge is modeled explicitly in the graph. The weights next to each edge in the graph represent the number of flip-flops in that connection. For example, there exist two flip-flops on the path from the output of gate G6 to the input of gate G5. This is modeled as an edge from G6 to G5 with a weight of 2.

Register retiming attempts to label every vertex, i, in a retiming graph with a label $r_i$ that represents the number of flip-flops that move across vertex i. Label $r_i$ is an integer and can be positive or negative. A positive (negative) value of $r_i$ indicates the number of flip-flops that moved backward (forward) across vertex i as part of the retiming solution. The labels of the primary input and primary output nodes are fixed at 0. A retiming label of 0 implies there is no movement of flip-flops across that vertex.

The weight of an edge from vertex u to vertex v may be represented by and the weight of the same edge after retiming be represented by $nw_{uv}$. The relationship between these terms may be illustrated below.

$$nw_{uv} = r_v + w_{uv} - r_u \quad (1)$$

A path p exists from vertex a to vertex b if there is a sequence of vertices and edges from vertex a to vertex b, such that each vertex on the path has as input a directed edge from the previous vertex on the path. It should be appreciated that the path may be sequential or combinational, meaning that the number of flip-flops on all the edges in a path may be ≥0. The weight of the path, $w_p$, is the sum of the weights of all edges on the path. A combinational path has $w_p=0$. The clock period of the circuit is determined by the worst delay for all combinational paths in the circuit.

The following matrix relationships further illustrate how register retiming is performed.

$$W(u, v) = \min_{p: u \to v} \{w_p\} \quad (2)$$

$$D(u, v) = \max_{p: u \to v \text{ and } wp = W(u,v)} \{d_p\} \quad (3)$$

The W matrix in relationship (2) records an entry for every pair (u, v) of vertices that have a path between them. The entry that is recorded is the number of flip-flops on a path from u→v that has the minimum number of flip-flops. This path has the minimum latency from u→v. For every pair of vertices (u, v), the D matrix in relationship (3) stores the maximum delay of the path from u→v whose flip-flop count was stored in the W matrix.

When taking the min-period retiming approach, the following constraints need to be satisfied. After retiming, all edge weights need to be non-negative ($nw_{uv} \geq 0$). This allows relationship (1) to be represented with the following relationship.

$$r_v - r_u \geq -w_{uv} \quad (4)$$

In addition, for a clock period, c, each path from u→v that has D(u,v)>c requires at least one register on it. This constraint is illustrated with the following relationship.

$$r_v - r_u \geq -W(u,v) + 1 \quad \forall u \to v \text{ such that } D(u,v) > c \quad (5)$$

When taking the constrained min-area retiming approach, embodiments of the present disclosure attempts to find a retiming solution that satisfies a user-specified clock period with the minimum number of registers. The constraints for the retiming solution to be valid are the same as those found in relationships (4) and (5). The complete formulation for the constrained min-area retiming for a target clock period of c is shown as follows.

$$\min \Sigma_{v \in V}(|F1(v)| - |F0(v)|)r_v$$

$$r_v - r_u \geq -w_{uv} \quad \forall e_{uv} \in E$$

$$r_v - r_u \geq -W(u,v) + 1 \quad \forall D(u,v) > c \quad (6)$$

The computation of the W and D matrices represented in relationships (2) and (3) is central to most retiming algorithms. These matrices are primarily used to solve the constrained min-period retiming problem which involves adding new edges to the retiming graph that represent timing constraints. In addition to the original "circuit" edges, additional "period" edges corresponding to the timing constraints in relationships (5) and (6) are added to the graph. These period edges from u→v have a weight of W(u, v)−1.

With the period edges, the W and D matrices become very dense. Prior work in the field of register retiming formulation have focused on improving the efficiency of computing and storing values represented in the matrices in relationships (2) and (3). For example, there are many pairwise redundant entries on a timing path that each have an entry in the matrices. Where a path may not satisfy a timing constraint, a sub-path of the larger path may satisfy that timing constraint. The computation of the matrices involved path traversal algorithms and shortest path computations using variants of Dijkstra's and Floyd-Warshall algorithms. While pruning of timing constraints helped address the space complexity, runtime complexity worsened.

The relaxation-based retiming algorithm for a given clock period in prior works did not compute the values represented in the matrices in relationships (2) and (3) explicitly. Instead, it relied on an external timing analysis engine to provide delays in a relaxation-based iterative approach. The approach updated delays of a circuit using static timing analysis after a retiming solution. New delays in the circuit are then used to determine new constraints of the form in relationship (5) for paths that fail timing. The procedure repeats by continuing to find a retiming solution to this new constraint problem until a maximum number of iterations is exhausted. Other approaches identified negative cycles in a retiming graph to identify infeasible solutions for a given clock period. This led to faster convergence of a solution at the cost of large numbers of calls to the external timing analysis engine during every iteration of the relaxation process. The prior approaches discussed relied on expressing constraints in the difference of two variables form as represented in relationships (4) and (5). Constraints of this particular form can be solved an using an algorithm developed by Bellman-Ford for determining the shortest path between two nodes in a graph.

A new formulation for solving a global retiming problem is disclosed according to an embodiment of the present disclosure. The formulation models timing analysis natively. As such, external calls to static timing analysis are not required and no static timing information is computed prior to solving for retiming labels/variables. The formulation also does not require explicit circuit path traversals to derive timing constraints. The retiming graph generated during register retiming also need not utilize any special timing constraint edges or any matrices to store delay values or path weight values.

A programming language that supports constraints, such as SystemVerilog, may be used to formulate the retiming problem. It should be appreciated that the constraints formulated may be solved using any solver that supports such constraints.

Figure 4:
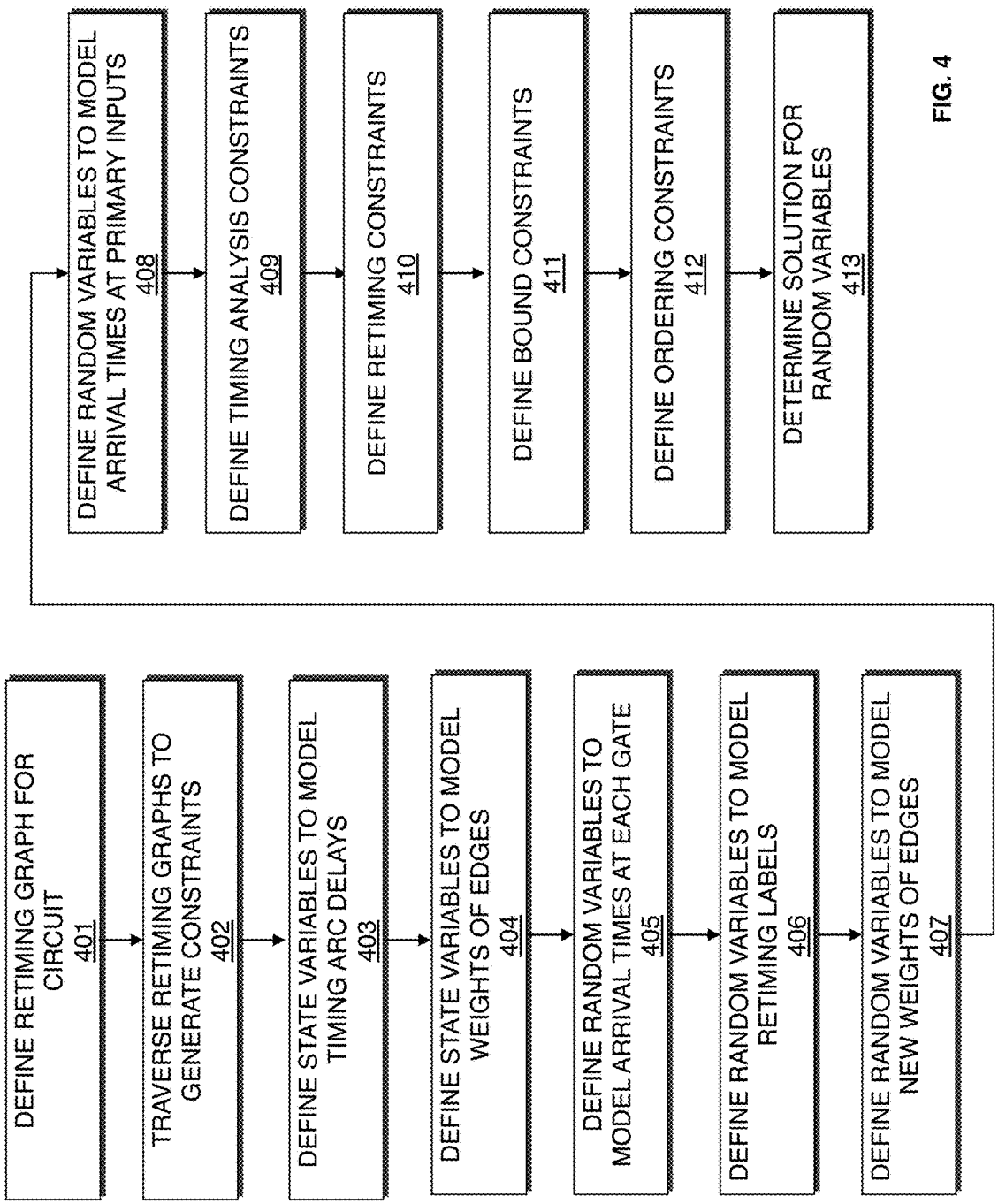
FIG. 4 is a flow chart illustrating a method for performing register retiming for min-period retiming according to an exemplary embodiment of the present disclosure.

FIG. 4 is a flow chart illustrating a method for performing register retiming according to an exemplary embodiment of the present disclosure. The procedure illustrated in FIG. 4 may be used to implement procedure 104 (shown in FIG. 1).

At 401, a retiming graph is generated from an HDL description of a circuit. According to an embodiment of the present disclosure, the retiming graph models combinational nodes as vertices with weights on edges representing a number of flip-flops between corresponding combinational nodes represented by that edge.

At 402, the retiming graph is traversed to generate constraints. According to an embodiment of the present disclosure, the constraints may be processed by a constraints solver.

At 403, a first set of state variables is defined. The first set of state variables model timing arc delays for every node in the retiming graph. According to an embodiment of the present invention, a timing arc delay for a node represents the propagation delay of a signal from a node input to a node output.

At 404, a second set of state variables is defined. The second set of state variables models weights for edges in the retiming graph. According to an embodiment of the present disclosure, a weight for an edge in the retiming graph represents a number of flip-flops on the edge. The state variables identified at 403-404 have values that do not change.

At 405, a first set of random variables is defined. The first set of random variables models arrival times at each gate. According to an embodiment of the present disclosure, the arrival time at a node is the time it takes for the signal to arrive from the primary inputs of the circuit. This includes all worst delays encountered on the paths from the primary inputs to the node. Any input delay on the primary inputs is also accounted for in the arrival time of a node.

At 406, a second set of random variables is defined. The second set of random variables model retiming labels for each node in the retiming graph. According to an embodiment of the present disclosure, a retiming label identifies a number and direction of flip-flop moves across its associated node.

At 407, a third set of random variables is defined. The third set of random variables model new weights of edges. According to an embodiment of the present disclosure, a new weight for an edge in the retiming graph represents a number of flip-flops on the edge after register retiming is performed.

At 408, a fourth set of random variables is defined. The fourth set of random variables model arrival times at primary inputs. According to an embodiment of the present disclosure, the arrival times at the primary inputs represent the delay for the signals at the primary inputs to be available from the environment in which the circuit is operated.

At 409, timing analysis constraints are defined. According to an embodiment of the present disclosure, the timing analysis constraints perform static timing analysis during the solving process. The constraints allow the constraints solver to compute arrival times on every node in the circuit within the solver as it decides on solutions to the register retiming constraints. This technique of natively modeling timing analysis within the solving process enables a fast and accurate retiming solution that automatically satisfies the timing requirements for the each solver iteration.

At 410, retiming constraints are defined. According to an embodiment of the present disclosure, for each edge in the retiming graph of the circuit, a retiming constraint is modeled from relationship (1). The state variables and random variables defined for the weights of edges in the retiming graph, the retiming labels for all nodes in the retiming graph, and the new weights of the edges in the retiming graph are used to formulate the retiming constraints.

At 411 bound constraints are defined. According to an embodiment of the present disclosure, bound constraints may be used to limit a range for the random variables.

At 412, ordering constraints are defined. According to an embodiment of the present disclosure, ordering constraints may be used to specify an order in which solutions to random variables are sought.

At 412, a solution for the random variables is sought. According to an embodiment of the present disclosure, values for the random variables are solved for given the state variables and constraints defined. Solutions for the random variables may be computed using an equation solving routine or program which operates as a general-purpose constraints solver.

It should be appreciated that the procedures described with reference to FIG. 4 may be implemented by a machine such as an EDA tool executed on a processor, by a user, or combination of a processor and user.

The following example illustrates how the register retiming method described with reference to FIG. 4 may be performed on the sequential circuit illustrated in FIG. 2A and the retiming graph illustrated in FIG. 3 according to an embodiment of the present disclosure. Since all gates in this circuit have two inputs, the notation we use is that the first input pin is a, the second input pin is b, and the output is z. For example, variables with a1 in their names are referring to the a input of gate G1. Every primary input and primary output is also modeled with a one-input node. In this example, the primary input node A is modeled with variable names that include in1, the primary input node B is modeled with variable names that include in2, the primary output node O is modeled with array and variable names that contain out. SystemVerilog is used as the programming language in this example. It should be appreciated, however, that other programming languages or tools may be used to implement the methodology described. The example below begins at procedure 402 where a retiming graph is traversed to generate constraints.

At 403, a first set of state variables is defined to model timing arc delays. According to an embodiment of the present disclosure, this includes all timing arcs from inputs to output of every combinational logic gate, primary input nodes, and primary output nodes. The timing arcs may be modeled as 32-bit unsigned integers or other bit widths. Flip-flops are assumed to have a same clock to Q delay. The setup-time of every flip-flop may be assumed to be a value, such as zero or other value.

According to an embodiment of the disclosure, an example of defining state variables that model timing arc delays is shown below.

```
// Gate timing arcs
bit[31:0] a1_to_z1, b1_to_z1;
bit[31:0] a2_to_z2, b2_to_z2;
bit[31:0] a3_to_z3, b3_to_z3;
bit[31:0] a4_to_z4, b4_to_z4;
bit[31:0] a5_to_z5, b5_to_z5;
bit[31:0] a6_to_z6, b6_to_z6;
bit[31:0] max_arc_delay;
// Dummy primary outputs timing arcs
bit[31:0] aout_to_zout;
// Dummy primary inputs timing arcs
bit[31:0] ain1, ain1_to_zin1;
bit[31:0] ain2, ain2_to_zin2;
// FF setup time+clock to Q delay.
bit[31:0] clock_to_q_delay;
```

At 404, a second set of state variables is defined to model weights for edges in the retiming graph shown in FIG. 3. The weights for the edges in the retiming graph represent a number of flip-flops on a connection between a source node and a destination node in the retiming graph.

According to an embodiment of the disclosure, an example of defining state variables that model timing weights for edges in the retiming graph is shown below.

```
// Original FF counts
integer win1, win2, wout;
integer wa1, wb1;
integer wa2, wb2;
integer wa3, wb3;
integer wa4, wb4;
integer wa5, wb5;
integer wa6, wb6;
```

The disclosed formulation solves for the retiming label random variables, $r_i$, in relationship 1. These variables are defined for all vertices in the retiming graph (which correspond to the combinational nodes as well as the primary input and primary output nodes). Although all these variables can take positive or negative values, the variables corresponding to the primary input and primary output nodes must take value 0. This is because no flip-flops can move across the primary input and primary output nodes. According to an embodiment of the present disclosure, state variables are used for the retiming labels of the primary input and primary output nodes as shown below.

```
    // Retiming labels for primary inputs and outputs integer
        rin1, rin2, rout;
```

According to an embodiment of the present disclosure, the methodology for register retiming iteratively finds random solutions that satisfy all the constraints. This iteration is guided by performing a binary search. In the past, the binary search technique was used to find solutions for target clock periods (that are derived from a sorted list of delays from a pre-computed D matrix). When an iteration for a particular target clock period fails, the binary search backs up to a higher delay that is between the current failed delay and the previous successful delay. If an iteration succeeds for a particular target delay, the binary search tightens the target clock period to a delay that is halfway between the current delay and the lowest possible delay. The process continues until an optimal solution is found for the best achievable delay. Embodiments of the present disclosure follows a similar process, but without the computation of the D matrix. The methodology of the present disclosure searches for a solution that is less than or equal to the current target delay. The binary search process can be implemented within the constraints formulation itself or externally through repeated invocation of the solver with different target delays. The methodology of the present disclosure also allows for the flexibility to implement other forms of searches including random walks. The target delay may be modeled with a state variable as shown below.

```
    bit[31:0] target_delay;
```

At 405, a first set of random variables is defined to model arrival times at each gate. An important aspect of the present disclosure is modeling timing natively in the formulation. Since timing analysis is a function of the retiming solution, random variables are used to model the computation of arrival times. It should be appreciated that a similar model can be used for required times as well to allow for slack computation to be performed within the same framework. For simplicity, this example focuses on the min-period retiming problem, which only requires the modeling of arrival time computation. For each gate in the circuit, arrival time variables may be modeled as shown below.

```
    rand bit[31:0] a1, b1, z1, z1a, z1b;
    rand bit[31:0] a2, b2, z2, z2a, z2b;
    rand bit[31:0] a3, b3, z3, z3a, z3b;
    rand bit[31:0] a4, b4, z4, z4a, z4b;
    rand bit[31:0] a5, b5, z5, z5a, z5b;
    rand bit[31:0] a6, b6, z6, z6a, z6b;
```

Here a1, b1 refer to the arrival times on the a and b inputs of gate G1. The variable z1a refers to the delay from a→z of gate G1. Similarly, z1b refers to the delay from b→z of gate G1. The variable z1 refers to the worst delay on the output of gate G1. The variable z1 is computed as maximum of variables z1a and z1b.

At 406, a second set of random variables are defined to model retiming labels. The random variables for the retiming labels for each of the vertices (combinational nodes) in the retiming graph may be modeled as shown below.

```
    rand integer r1, r2, r3, r4, r5, r6
```

At 407, a third set of random variables is defined to model new weights on each edge of the retiming graph. A variable associated with each input of each node in the retiming graph is utilized. The new weights may be modeled as shown below.

```
    rand integer new_wa1, new_wb1;
    rand integer new_wa2, new_wb2;
    rand integer new_wa3, new_wb3;
    rand integer new_wa4, new_wb4;
    rand integer new_wa5, new_wb5;
    rand integer new_wa6, new_wb6;
    rand integer new_wout;
```

At 408, a fourth set of random variables is defined to model arrival times at primary inputs and outputs. The primary inputs and primary outputs may be modeled as shown below.

```
    // Primary outputs
    rand bit [31:0] aout, zout;
    // Primary inputs
    rand bit [31:0} zin1, zin2;
```

At 409, timing analysis constraints are defined. According to an embodiment of the present disclosure, the objective of timing analysis constraints is to compute the arrival times at the inputs and outputs of every node in the retiming graph concurrently while the retiming label variables are solved. As such, the constraints are implemented in a manner that allows them be evaluated by a constraints solver during the solving process. Furthermore, the timing analysis results may change depending on where the flip-flops have been moved. A rule that is followed in the timing analysis constraints is that if the weight on an edge is non-zero, then the arrival time on the destination node input is the clock_to_q delay of a flip-flop. Otherwise, the arrival time on the output of the source node is transferred as the arrival time of the input of the destination node. The timing analysis constraints are repetitive for each node in the retiming graph and follow the following procedure. 1) Determine arrival times at inputs of the node. 2) Determine arrival time at the output of the node for each input. 3) Determine arrival time at the output of the node as the worst (max) arrival time at the output across all inputs. The timing analysis constraints for the circuit in FIG. 2A may be defined as shown below.

```
// Compute arrivals of all gates
zin1==ain1+ain1_to_zin1;
zin2==ain2+ain2_to_zin2;
a1==((new_wa1==0) ? zin1:clock_to_q_delay);
b1==((new_wb1==0) ? zin2:clock_to_q_delay);
z1a==a1+a1_to_z1;
z1b==b1+b1_to_z1;
z1==((z1a>z1b) ? z1a:z1b);
a2==((new_wa2==0) ? zin1:clock_to_q_delay);
b2==((new_wb2==0) ? zin2:clock_to_q_delay);
z2a==a2+a2_to_z2;
z2b==b2+b2_to_z2;
z2==((z2a>z2b) ? z2a:z2b);
a3==((new_wa3==0) ? z1:clock_to_q_delay);
b3==((new_wb3==0) ? z2:clock_to_q_delay);
z3a==a3+a3_to_z3;
z3b==b3+b3_to_z3;
z3==((z3a>z3b) ? z3a:z3b);
a4==((new_wa4==0) ? z3:clock_to_q_delay);
b4==((new_wb4==0) ? z6:clock_to_q_delay);
z4a==a4+a4_to_z4;
z4b==b4+b4_to_z4;
z4==((z4a>z4b) ? z4a:z4b);
a5==((new_wa5==0) ? z3:clock_to_q_delay);
b5==((new_wb5==0) ? z6:clock_to_q_delay);
z5a==a5+a5_to_z5;
z5b==b5+b5_to_z5;
z5==((z5a>z5b) ? z5a:z5b);
a6==((new_wa6==0) ? z4:clock_to_q_delay);
b6==((new_wb6==0) ? z5:clock_to_q_delay);
z6a==a6+a6_to_z6;
z6b==b6+b6_to_z6;
z6==((z6a>z6b) ? z6a:z6b);
aout==((new_wout==0) ? z6:clock_to_q_delay);
zout==aout+aout_to_zout;
```

Ternary expressions are used in the timing analysis constraints to concisely describe the max function constraint as well as to decide whether to use the clock_to_q_delay for the start arrival time at the input of a node in the retiming graph. Similarly, these ternary expression constraints are used to accurately compute the maximum of the arrival times at the output node computed for each input arrival time, which then becomes the arrival time at the output node. If there are more than 2 inputs, these ternary expressions can also be nested or even verbosely expressed using 'if-else' conditional expressions. These types of complex constraints are beyond the scope of all prior work in the area of global retiming.

As described earlier, each call to the constraints solver solves for a particular target delay. The constraints solver is asked to solve for all the random variables while achieving the worst delay to be ≤the target delay. A key property that is true with arrival time propagation in static timing analysis is that the arrival time at any node in a combinational path is ≤the arrival time at the end node of the combinational path. As such, if the arrival time at the end node of every combinational path is to be ≤the target delay, it can be concluded that the arrival time at every node in the circuit has to be ≤the target delay. The target delay constraints may be defined as shown below.

```
z1<=target_delay;
z2<=target_delay;
z3<=target_delay;
z4<=target_delay;
z5<=target_delay;
z6<=target_delay;
```

A simple lower bound on the target delay can also be stated as the largest arc delay among all input-output pairs of all combinational nodes in the circuit. In this example, an assumption is made that the loading on a gate does not affect the arc delays of the gate. A lower bound constraint may be introduced where max_arc_delay may be pre-computed or be computed as part of state variable initialization using the timing arc state variables described earlier. The lower bound constraint may be defined as shown below.

```
target_delay>=max_arc_delay;
```

At 410, retiming constraints are defined for each edge in the retiming graph. Although the new weight variables are declared as signed integers, the retiming constraints may also be used to require that these new weights should not be negative.

The retiming constraints may be defined as shown below.

```
// Retiming constraints
new_wa1==(r1+wa1-rin1);
new_wb1==(r1+wb1-rin2);
new_wa2==(r2+wa2-rin1);
new_wb2==(r2+wb2-rin2);
new_wa3==(r3+wa3-r1);
new_wb3==(r3+wb3-r2);
new_wa4==(r4+wa4-r3);
new_wb4==(r4+wb4-r6);
new_wa5==(r5+wa5-r3);
new_wb5==(r5+wb5-r6);
new_wa6==(r6+wa6-r4);
new_wb6==(r6+wb6-r5);
new_wout==(rout+wout-r6);
new_wa1>=0;
new_wb1>=0;
new_wa2>=0;
new_wb2>=0;
new_wa3>=0;
new_wb3>=0;
new_wa4>=0;
new_wb4>=0;
new_wa5>=0;
new_wb5>=0;
new_wa6>=0;
new_wb6>=0;
new_wout>=0;
```

At 411, bound constraints are defined to limit a range for the random variables. It should be appreciated that this procedure is optional. According to an embodiment of the disclosure, if it can be assumed that movement of flip-flops will not be required beyond a certain number during register retiming, values for the variable $r_i$ may be constrained to allow for more efficient computation. The bound constraints may be helpful to prevent wrap-around semantics that may result in incorrect values of $r_i$. The following bound constraints may be defined.

```
r1>=-max_ffs; // -(2^29-1)
r1<=max_ffs;
r2>=-max_ffs;
r2<=max_ffs;
r3>=-max_ffs;
``` r3<=max_ffs;
r4>=-max_ffs;
r4<=max_ffs;
r5>=-max_ffs;
r5<=max_ffs;
r6>=-max_ffs;
r6<=max_ffs;

In this example, max_ffs may be set to a value that will prune the search space for the constraints solver. According to an embodiment of the disclosure max_ffs may be set to the total number of flip-flops in the circuit.

At 412, ordering constraints are defined. According to an embodiment of the present disclosure, ordering constraints may be implemented to prune the search space for the constraints solver as well as describe flow of events to the constraints solver. One example of such flow of events is the static timing analysis problem. According to an aspect of the present disclosure, a first set of ordering constraints are implemented for the timing analysis constraints. For example, the ordering constraints guide the solver to compute the arrival times on the inputs of a node before computing the arrival time at the output of the node. Ordering constraints for arrival time variables may also be defined to reflect the topological ordering of the nodes in the circuit. These ordering constraints help the constraints solver accomplish native timing analysis in an efficient manner. A second set of ordering constraints are implemented for the retiming label variables and the new weight variables. These ordering constraints ensure that the new weight variables are only assigned a value after the values of the corresponding source node and destination nodes are computed. This helps improve the performance of the solver. The ordering constraints may be defined as shown below.

```
// Timing analysis ordering constraints
solve zin1, zin2 before a1, b1, a2, b2;
solve a1, b1, a2, b2 before z1a, z1b, z2a, z2b;
solve z1a, z1b before z1;
solve z2a, z2b before z2;
solve z3a, z3b before z3;
solve z4a, z4b before z4;
solve z5a, z5b before z5;
solve z6a, z6b before z6;
// Retiming label variables ordering constraints
solve r1 before new_wa1;
solve r1 before new_wb1;
solve r2 before new_wa2;
solve r2 before new_wb2;
solve r3, r1 before new_wa3;
solve r3, r2 before new_wb3;
solve r4, r3 before new_wa4;
solve r4, r6 before new_wb4;
solve r5, r5 before new_wa5;
solve r5, r6 before new_wb5;
solve r6, r4 before new_wa6;
solve r6, r5 before new_wb6;
solve r6 before new_wout;
```

At 413, solutions for the random variables are sought given the defined state variables and constraints using a constraints solver. In this example, the following solutions were found for the random variables with the maximum delay to be 2.
r1=1
r2=1
r3=1
r4=0
r5=0
r6=-1

According to an embodiment of the present disclosure, an initial timing for the system may be computed. The initial timing may be useful for reporting the timing of the design from the constraints solver to ensure that the timing analysis constraints are working correctly and in sync with the external static timing analysis engine that make similar assumptions. The initial timing (initial delay) computed may also be used as an upper bound for the target delay variable. This will ensure that the constraints solver will never produce a solution that worsens the delay of the original circuit. In order to compute the initial timing, additional constraints may be added to ensure that no flip-flops are moved from their original positions during register retiming. The constraints solver would then compute the delay of all nodes in the retiming graph. The additional constraints shown below may be used to compute the initial timing. According to an embodiment of the present disclosure, these constraints are defined as a separate constraint block in the SystemVerilog constraints language and are only active during the initialization process. SystemVerilog allows to turn OFF this constraint block after initialization and before the process for solving the optimal retiming variables begins.

```
constraint c2 {
    r1==0;
    r2==0;
    r3==0;
    r4==0;
    r5==0;
    r6==0;
}
```

According to an embodiment of the present disclosure, a worst delay of the system may be computed. The following procedure may be implemented to identify the worst delay of the system. According to an embodiment of the present disclosure, the procedure computes the maximum delay at each node in the circuit for the current retiming solution.

```
task save_current_delay;
    worst_delay=z1;
    if (z2>worst_delay) begin
        worst_delay=z2;
    end
    if (z3>worst_delay) begin
        worst_delay=z3;
    end
    if (z4>worst_delay) begin
        worst_delay=z4;
    end
    if (z5>worst_delay) begin
        worst_delay=z5;
    end
    if (z6>worst_delay) begin
        worst_delay=z6;
    end
endtask
```

In this example, the initial delay of the system is identified as 6, and the worst delay after retiming is identified as 2. The new weights computed by the formulation are as follows.
wa1: 0, wb1: 0, wa2: 0, wb2: 0, wa3: 0, wb3: 0, wa4: 1, wb4: 1, wa5: 1, wb5: 1, wa6: 1, wb6: 1

Figure 5:
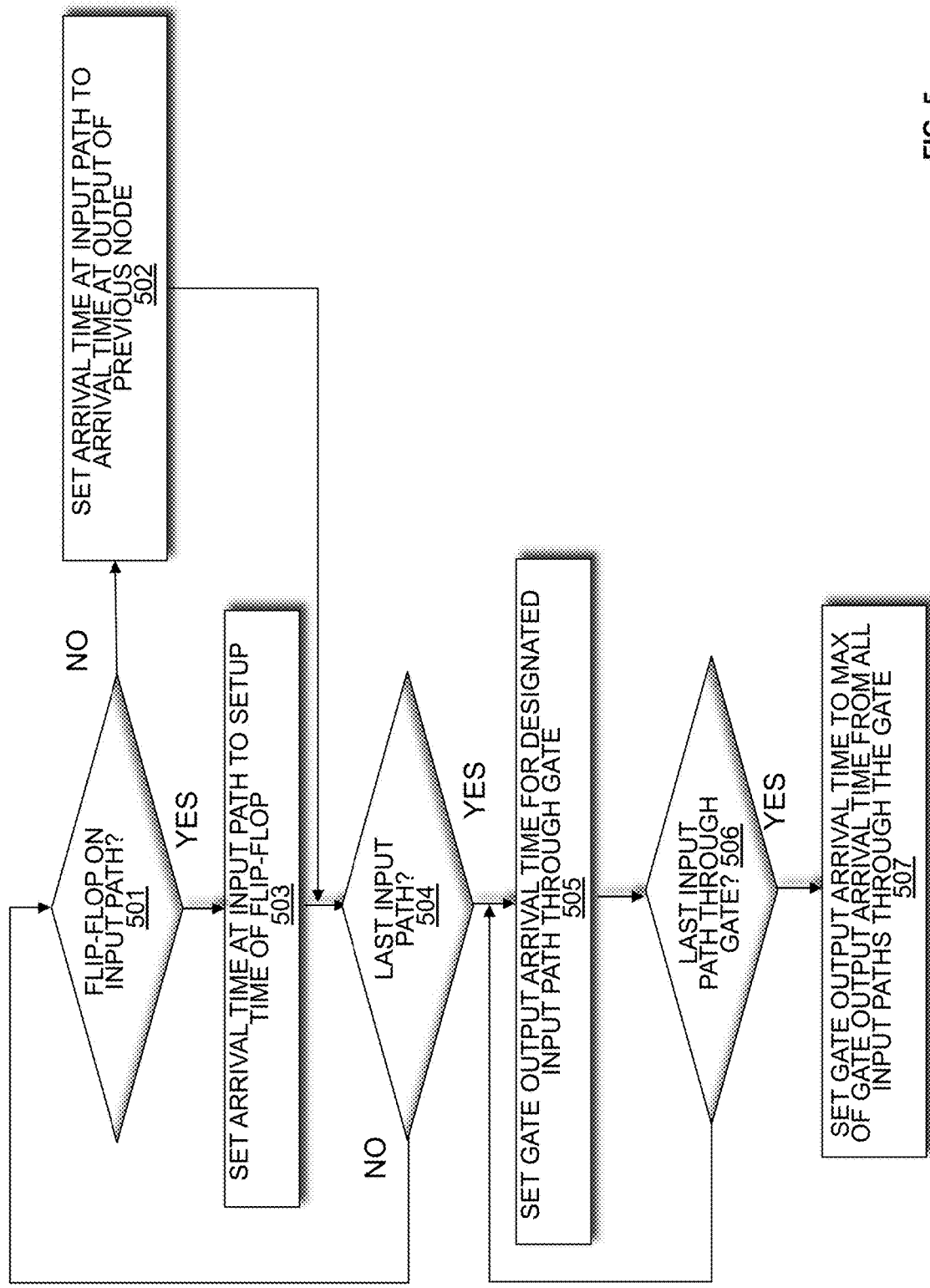
FIG. 5 is a flow chart illustrating a method for defining timing analysis constraints according to an exemplary embodiment of the present disclosure.

FIG. 5 is a flow chart illustrating a method for defining timing analysis constraints according to an exemplary embodiment of the present disclosure. The procedure illustrated in FIG. 5 may be used to implement procedure 409 (shown in FIG. 4). The procedure illustrated in FIG. 5 may be applied to each gate in the system to define the timing analysis constraints for the system.

At 501, it is determined whether a flip-flop resides on an input path. If a flip-flop does not reside on the input path, control proceeds to 502. If a flip-flop resides on the input path, control proceeds to 503.

At 502, the arrival time at the input path is set to the arrival time at an output of a previous node. Control proceeds to 504.

At 503, the arrival time at the input path is set to a setup time of the flip-flop.

At 504, it is determined whether the analyzed input path is the last input path. If another input path exists to the gate that has not been analyzed, control returns to 501 to analyze the new input path. If the analyzed input path is the last input path, control proceeds to 505.

At 505, the arrival time at the gate output is set for a designated input path through the gate. According to an embodiment of the present disclosure, the arrival time at the gate output for a designated input path through the gate is set to the arrival time at the input path (determined at 502/503) plus the timing arc delay (propagation delay) between the input to output of the component. The timing arc delay may be a predefined value.

At 506, it is determined whether the analyzed input path through the gate is the last input path through the gate. If another input path through the gate exists that has not been analyzed, control proceeds to 505 to analyze the new input path through the gate. If the analyzed input path through the gate is the last input path through the gate, control proceeds to 507.

At 507, the arrival time at the gate output is set to the arrival time at the gate output for an input path through the gate that is largest from those determined at 505.

According to an embodiment of the present disclosure, constrained min-area retiming may be performed using the formulation techniques described. The constrained min-area retiming problem attempts to achieve the best delay that satisfies a user-specified clock period constraint utilizing the minimum area on a target device. Finding a solution to the constrained min-area retiming problem may be achieved by first solving for the min-period retiming problem using the formulation with an added constraint that provides a lower bound on the target clock period to be the user-specified clock period. This ensures that the formulation does not over-optimize the design to achieve delays smaller than what is required. An example of the added constraint is shown below.

target_delay>=user_required_delay

Once the best delay that is closest to the user required delay is accomplished, an optimization is performed for the minimum number of flip-flops to achieve a delay≤the best target delay achieved initially. In this case, the cost function becomes the total number of flip-flops in the circuit, which is the sum of all the new weight variables. The optimal solution can be achieved by using a binary search algorithm either externally or within the constraints itself. During this search process, after each successive solve, an attempt is made to reduce the number of registers to be ≤the number of registers halfway between the current solution and the pre-established lower bound. For each such call to the constraints solver, the target delay is adjusted to be the best delay achieved to that point.

The techniques described with regard to the formulation and approach to solve the retiming problem is an improvement over prior approaches. The number of state variables required to model timing arc delay state is linear with respect to each combinational node in the circuit. The number state variables required to model edge weight is linear with respect to the number of edges in the circuit. The number of random variables required to define arrival times is proportional to the number of input-output pairs for all combinational nodes in the circuit. The number of random variables required to model retiming label variables is linear with respect to the number of combinational nodes in the circuit. The number of random variables required to model new weights is linear with respect to the number of edges in the retiming graph.

The number of timing analysis constraints is proportional to the number of combinational nodes in the retiming graph and the average number of inputs of all combinational nodes in the circuit. The number of retiming constraints is linear with respect to the number of edges in the retiming graph. The number of bound constraints is linear with respect to the number of combinational nodes in the circuit. The number of timing analysis ordering constraints is linear with respect to the number of combinational nodes in the circuit. The number of retiming ordering constraints is linear with respect to the number of edges in the retiming graph.

Given these relationships, the new formulation does not suffer from exponential growth in the number of constraints required and/or delay matrix size as experienced in the prior approaches. Furthermore, there is no node-to-node pairwise type of constraints that usually results in non-linear behaviors.

FIGS. 1, 4, and 5 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 6:
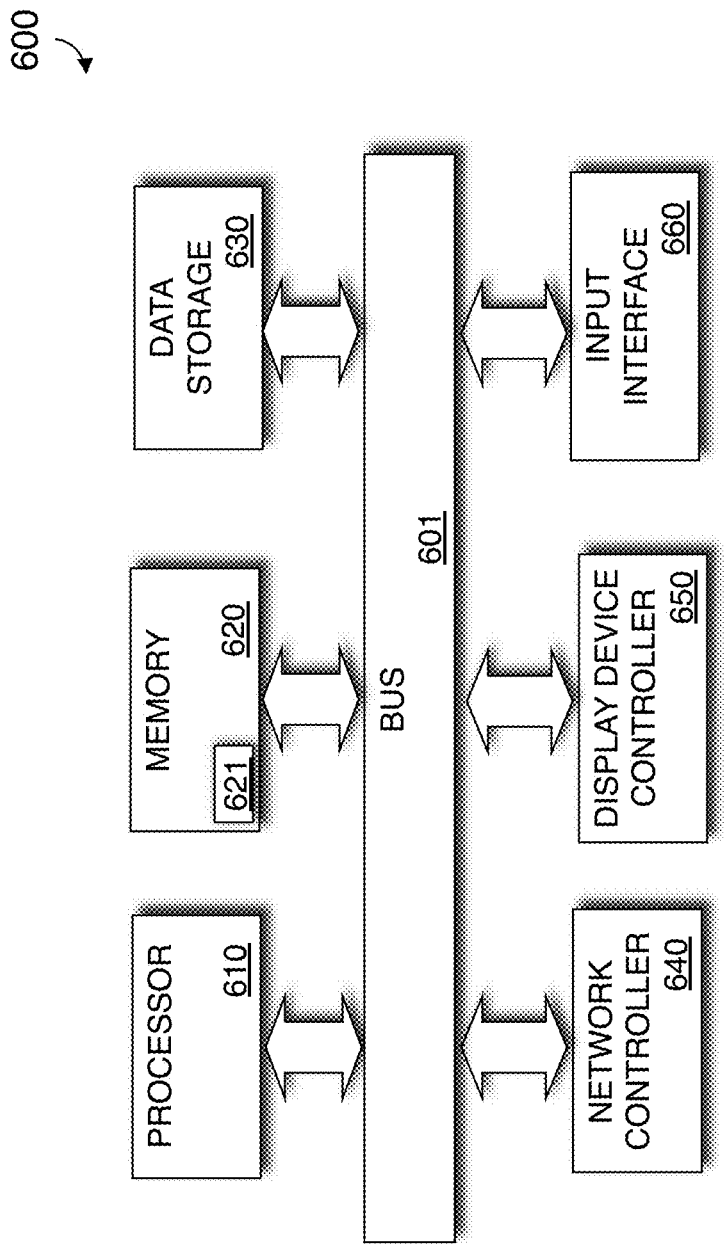
FIG. 6 illustrates a block diagram of a computer system implementing a system designer according to an exemplary embodiment of the present disclosure.

FIG. 6 is a block diagram of an exemplary computer system 600 in which an example embodiment of the present invention resides. The computer system 600 includes a processor 610 that process data signals. The processor 610 is coupled to a bus 601 or other switch fabric that transmits data signals between processor 610 and other components in the computer system 600. The computer system 600 includes a memory 620. The memory 620 may store instructions and code represented by data signals that may be executed by the processor 610. A data storage device 630 is also coupled to the bus 601.

A network controller 640 is coupled to the bus 601. The network controller 640 may link the computer system 600 to a network of computers (not shown) and supports communication among the machines. A display device controller 650 is coupled to the bus 601. The display device controller 650 allows coupling of a display device (not shown) to the computer system 600 and acts as an interface between the display device and the computer system 600. An input interface 660 is coupled to the bus 601. The input interface 660 allows coupling of an input device (not shown) to the computer system 600 and transmits data signals from the input device to the computer system 600.

A system designer 621 may reside in the memory 620 and be executed by the processor 610. The system designer 621 may operate to design a system by performing synthesis, placement, and routing on the system. The system designer 621 may also perform register retiming. According to an embodiment of the present disclosure, register retiming may include applying timing analysis constraints when solving for retiming labels that represent a number and direction of register movement along a path between nodes in the system to improve timing.

Figure 7:
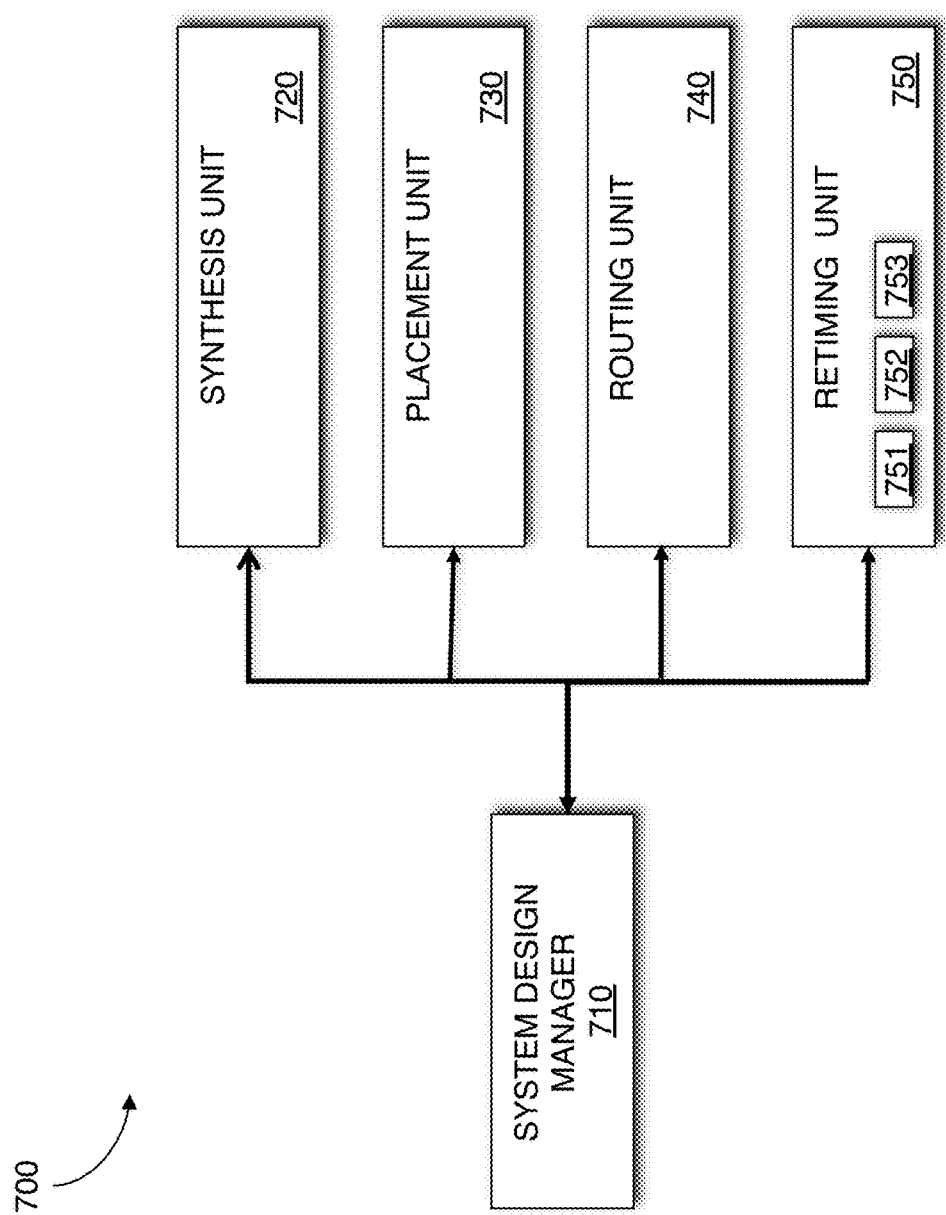
FIG. 7 is a block diagram of a system designer according to an exemplary embodiment of the present disclosure.

FIG. 7 illustrates a system designer 700 according to an embodiment of the present invention. The system designer 700 may be an EDA tool for designing a system on a target device such as an FPGA, structured application-specific integrated circuit (ASIC), or other circuitry. FIG. 7 illustrates modules implementing an embodiment of the system designer 700. According to one embodiment, the modules represent software modules and system design may be performed by a computer system such as the one illustrated in FIG. 6 executing sequences of instructions represented by the modules shown in FIG. 7. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 700 includes a designer manager 710. The designer manager 710 is connected to and transmits data between the components of the system designer 700.

The system designer 700 includes a synthesis unit 720 that generates a logic design of a system to be implemented on the target device. According to an embodiment of the system designer 700, the synthesis unit 720 takes a conceptual HDL design definition and generates an optimized logical representation of the system. The optimized logical representation of the system generated by the synthesis unit 720 may include a representation that has a reduced number of functional blocks and registers, such as logic gates and logic elements, required for the system. Alternatively, the optimized logical representation of the system generated by the synthesis unit 720 may include a representation that has a reduced depth of logic and that generates a lower signal propagation delay.

The synthesis unit 720 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 700 includes a placement unit 730 that processes the optimized technology-mapped netlist to produce a placement for each of the functional blocks. The placement identifies which components or areas on the target device are to be used for specific functional blocks and registers.

The system designer 700 includes a routing unit 740 that determines the routing resources on the target device to use to provide interconnection between the components implementing functional blocks and registers of the logic design.

The system designer 700 includes a register retiming unit 750 that improves the performance of sequential circuits in the system by repositioning flip-flops (registers) without changing the combinational nodes. The register retiming unit 750 may perform the optimizations described with reference to FIGS. 2A-2C by applying timing analysis constraints when solving for retiming labels that represent a number and direction of register movement along a path between nodes in the system to improve overall circuit timing.

According to an embodiment of the present disclosure, the register retiming unit 750 includes a variable processing unit 751 that defines state variables that model timing arc delays, and weights that represent registers between connections. The variable processing unit 751 also defines random variables that model arrival times at gates and primary inputs and outputs, retiming labels, and new weights that represent registers between connections after register retiming. The register retiming unit 750 also includes a constraints processing unit 752 that define timing analysis constraints, retiming constraints, bound constraints, and ordering constraints. The register retiming unit 750 also includes a constraints solver 753 that operates to solve for random variables given the state variables and constraints as described with reference to FIGS. 4-5. The register retiming unit 750 may perform register retiming during and/or after synthesis, placement, and/or routing.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 8:
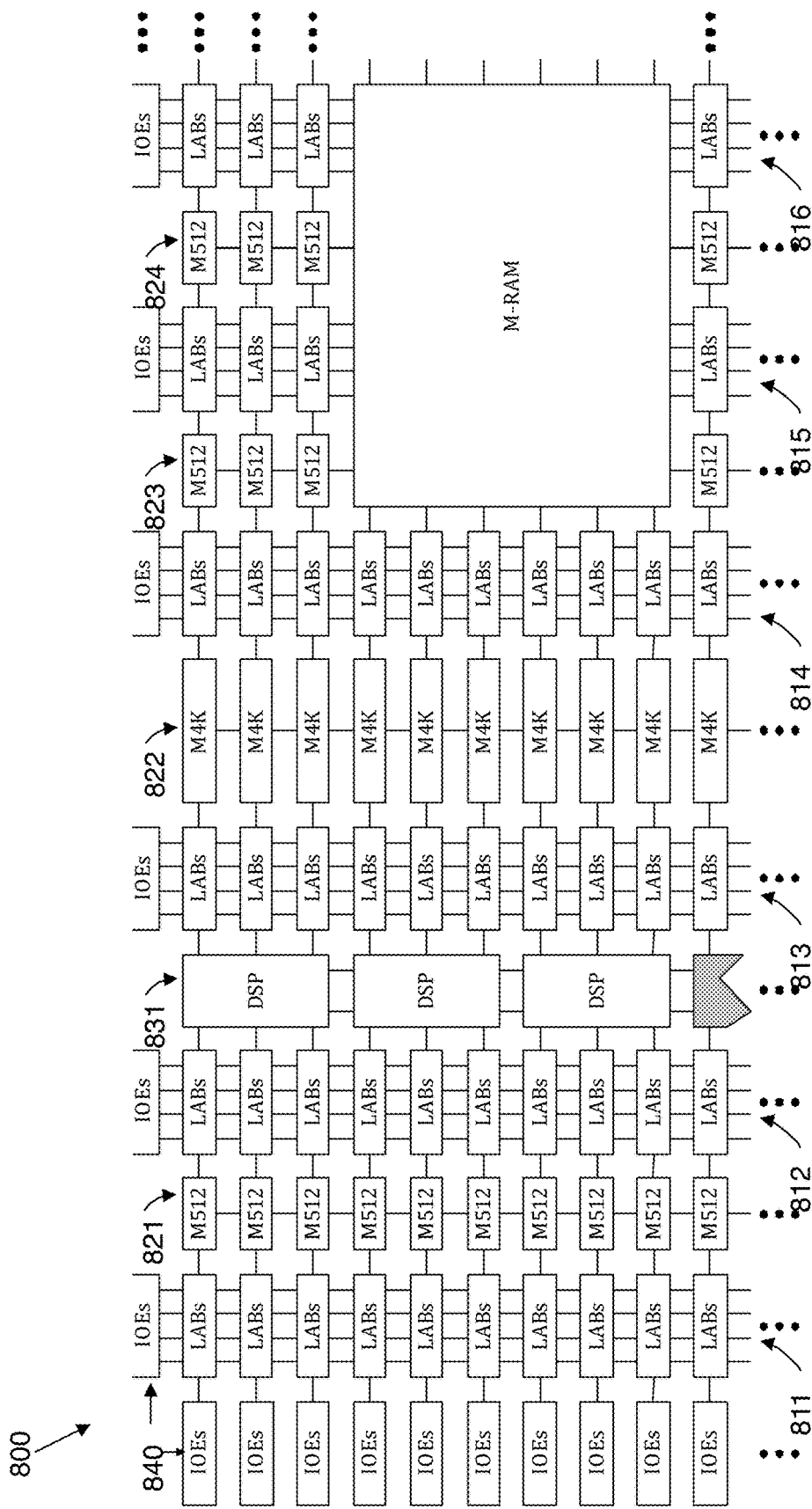
FIG. 8 illustrates an exemplary target device according to an exemplary embodiment of the present disclosure.

FIG. 8 illustrates a device 800 that may be used to implement a target device according to an embodiment of the present invention. The device 800 is a field programmable gate array (FPGA) that includes a plurality of logic-array blocks (LABs). According to an embodiment of the present invention, the device 800 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera/Intel Corporation, or a combinational logic block (CLB) such as those found in Virtex/Ultrascale devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 800. Columns of LABs are shown as 811-816. It should be appreciated that the logic block may include additional or alternate components.

The device 800 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 800. Columns of memory blocks are shown as 821-824.

The device 800 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 800 and are shown as 831.

The device 800 includes a plurality of input/output elements (IOEs) 840. Each IOE feeds an IO pin (not shown) on the device 800. The IOEs 840 are located at the end of LAB rows and columns around the periphery of the device 800. Each IOE may include a bidirectional IO buffer and a plurality of registers for registering input, output, and output-enable signals.

The device 800 may include routing resources such as LAB local interconnect lines, row interconnect lines ("H-type wires"), and column interconnect lines ("V-type wires") (not shown) to route signals between components on the target device. Although the exemplary device 800 illustrated in FIG. 8 is a FPGA, the present disclosure may be applied to ASICs and to any general digital circuit implementation.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
   synthesizing the system;
   placing the system on the target device;
   routing the system on the target device;
   performing register retiming on the system by solving for retiming labels, wherein solving for retiming labels includes applying timing analysis constraints when solving for the retiming labels that represent a number and direction of register movement along a path between nodes in the system to improve timing, wherein the register retiming is performed during and after one of the synthesizing, placing, and routing;
   generating a data file that describes the system that has been synthesized, placed, routed, and register retimed; and
   programming the target device with the data file to physically transform components on the target device to implement the system, wherein the target device is a field programmable gate array, wherein performing register retiming is performed by a processor.

2. The method of claim 1 further comprising defining the timing analysis constraints for each of the nodes, wherein the timing analysis constraints reflect a relationship between output arrival times of the nodes and timing arc delays for the nodes and a new weight on an input connection to the node representing a number of registers on the input connection after register retiming.

3. The method of claim 1, wherein the register retiming is performed independent of identifying all connections between all nodes of the system, a minimum weight that represents a minimum number of registers on the connections between all of the nodes, and a maximum delay for utilizing the connections between all the nodes.

4. The method of claim 1 further comprising defining state variables that model timing arc delays for nodes on a retiming graph of the circuit, and weights representing registers on a connection between the nodes.

5. The method of claim 4 further comprising defining random variables that model the retiming labels, and new weights representing registers on the connection between the nodes after register retiming.

6. The method of claim 5 further comprising defining a retiming constraint for each edge connected to the nodes that reflects a relationship between the state variables and the random variables.

7. The method of claim 6 further comprising defining bounding constraints that restrict values for the random variables.

8. The method of claim 6 further comprising defining ordering constraints that provide an order for which to solve for values of the random variables.

9. The method of claim 5 further comprising determining an initial timing of the system by setting the retiming labels to zero.

10. The method of claim 1, wherein performing register retiming on the system, comprises:
    defining state variables that model a timing arc delay for nodes on a retiming graph of the system, and weights representing registers on a connection between the nodes;
    defining random variables that model retiming labels representing a number and direction of register movement relative to the nodes, new weights representing registers on the connection between the nodes after register retiming, and arrival times on inputs and outputs of each of the nodes;
    defining a retiming constraint for each connection between the nodes that reflects a relationship between the state variables and the random variables;
    defining timing analysis constraints for each of the nodes that reflect a relationship between output arrival times of a node and a timing arc delay for the node and a new weight on an input connection to the node; and
    determining values for the random variables in response to the retiming constraint for each connection between the nodes and the timing analysis constraints for each of the nodes such that a target delay constraint is met.

11. The method of claim 10, wherein determining the values for the random variables is performed independent of identifying all connections between the nodes, a minimum weight that represents a minimum number of registers on the connections between the nodes, and a maximum delay for utilizing the connections between the nodes.

12. The method of claim 10 further comprising defining bounding constraints that restrict values for the random variables.

13. The method of claim 10 further comprising defining ordering constraints that provide an order for solving for values of the random variables.

14. The method of claim 10 further comprising determining an initial timing of the system by setting values for the retiming labels to zero.

15. The method of claim 10, wherein determining values for the random variables is performed after one of the synthesizing, placing, and routing.

16. The method of claim 10, wherein an initial delay computed from timing analysis is used for an upper bound target delay constraint.

17. The method of claim 10, wherein a largest arc delay among all input-output pairs of all combinational nodes is used for a lower bound target delay constraint.

18. The method of claim 10, wherein the timing analysis constraints reflect relationships with random variables for timing analysis, and the random variables for timing analysis are solved simultaneously with random variables for the retiming labels.

19. A system designer, comprising:
a synthesis unit that synthesizes a system;
a placement unit that places the system on a target device;
a routing unit that routes the system on the target device;
a register retiming unit that performs register retiming by solving for retiming labels on a system, wherein solving for the retiming labels includes applying timing analysis constraints and retiming constraints when solving for the retiming labels that represent a number and direction of register movement along a path between nodes in the system, and arrival times on each node in the system to improve timing and meet target delay constraints, wherein the register retiming unit comprises a constraints unit that applies timing analysis constraints for each of the nodes, wherein the timing analysis constraints reflect a relationship between output arrival times of the node and timing arc delays for the node and a new weight on an input connection to the node representing a number of registers on the input connection after register retiming; and
an assembly unit that generates a data file that describes the system that has been synthesized, placed, routed, and register retimed, and that programs the target device with the data file to physically transform components on the target device to implement the system, wherein the target device is a field programmable gate array.

* * * * *